(12) United States Patent
Kirikian

(10) Patent No.: US 6,289,544 B1
(45) Date of Patent: Sep. 18, 2001

(54) VEHICLE WASHING APPARATUS

(75) Inventor: Christian A. Kirikian, Lawrenceville, NJ (US)

(73) Assignee: Kirikian Industries, LLC, Trenton, NJ (US)

( * ) Notice: Subject to any disclaimer, the term of this patent is extended or adjusted under 35 U.S.C. 154(b) by 0 days.

(21) Appl. No.: 09/379,419

(22) Filed: Aug. 21, 1999

(51) Int. Cl.$^7$ ...................................................... B60S 3/06
(52) U.S. Cl. ...................... 15/97.3; 15/230.14; 15/230.16
(58) Field of Search ...................... 15/97.3, 230, 230.14, 15/230.16, 230.17, 230.19, DIG. 2

(56) References Cited

U.S. PATENT DOCUMENTS

| | | | |
|---|---|---|---|
| 648,890 | * 5/1900 | Williams | 15/230.14 |
| 1,011,323 | * 12/1911 | Courtney | 15/230.14 |
| 4,018,014 | * 4/1977 | Belanger | 15/230.19 |
| 4,217,737 | * 8/1980 | Hasegawa | 15/230.17 |
| 4,377,878 | * 3/1983 | Pecora . | |
| 4,567,619 | * 2/1986 | Clark . | |
| 4,603,447 | * 8/1986 | Beer | 15/230.16 |
| 5,461,745 | * 10/1995 | Nittoli . | |
| 5,784,748 | * 7/1998 | Belanger . | |
| 5,884,356 | * 3/1999 | Zigerlig | 15/230.19 |

\* cited by examiner

*Primary Examiner*—Randall E. Chin
(74) *Attorney, Agent, or Firm*—Samuel L. Sachs

(57) ABSTRACT

A vehicle washing apparatus for mounting on a rotatable shaft which includes a substantially cylindrical surface having an inner face and an outer face, said substantially cylindrical surface having a plurality of spaced apart slots disposed therethrough; and a plurality of flexible elongated pads, each of said pads for insertion through adjacent said spaced apart slots for radially extending from the outer face of the cylindrical surface, a portion of each of the pads being exposed adjacent to the inner face of the cylindrical surface.

26 Claims, 6 Drawing Sheets

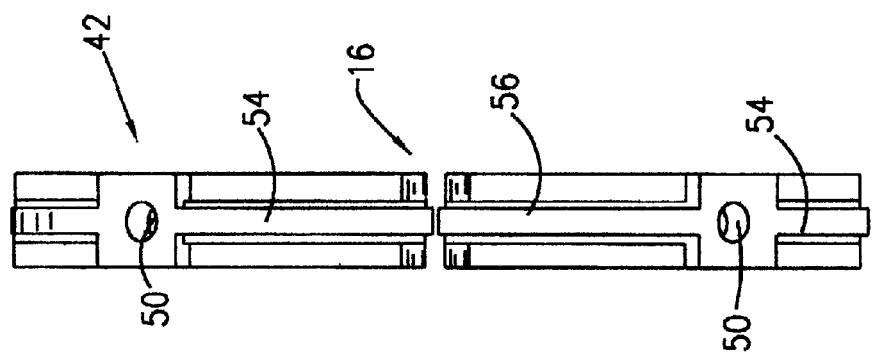
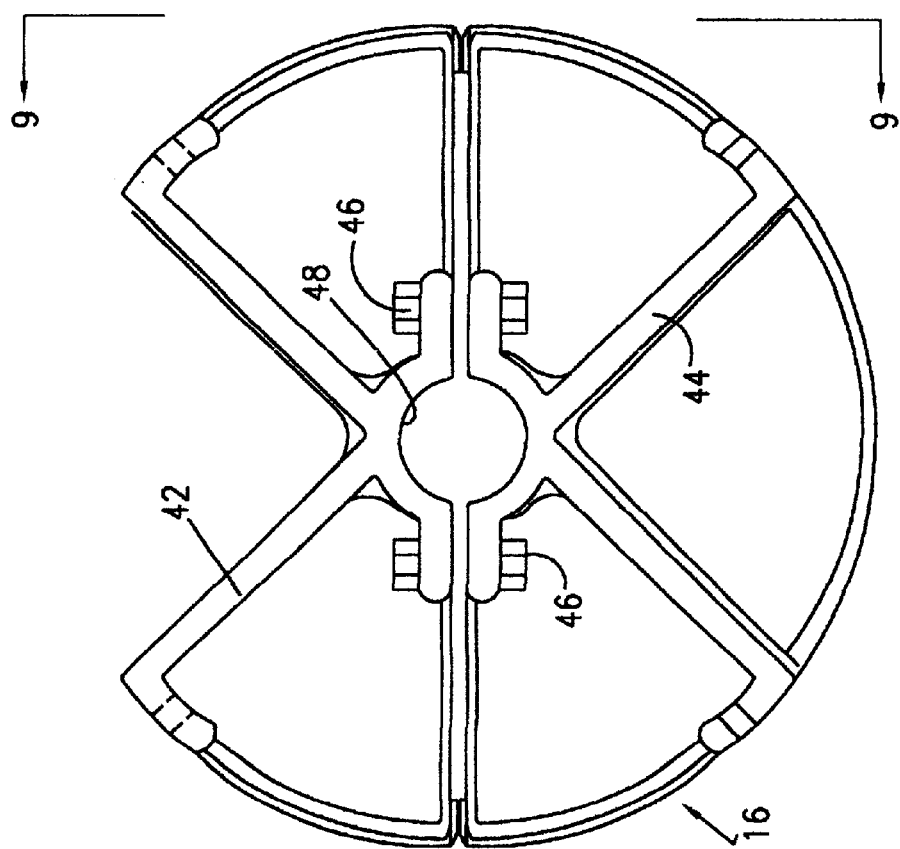

VEHICLE WASHING APPARATUS

BACKGROUND OF THE INVENTION

1. Field of the Invention

The present invention relates to rotational devices for cleaning vehicles, and more particularly to a vehicle washing apparatus which includes a plurality of elongated pads which contact the vehicles surface for cleaning upon rotation.

2. Description of the Prior and Contemporary Art

The use of rotational devices for cleaning of vehicles has undergone constant research and improvement over several decades. A consistent problem is to find a material soft enough not to mar the finish of the vehicle or cause other damage and that is substantial enough to provide the scrubbing action necessary to clean the vehicle. Configurations of drums with brushes or other material extending therefrom are known in the art. Unfortunately, each have disadvantages relating to the harshness in which they contact the vehicle, the retention of dirt, moisture, and lack of longevity.

It had been learned that high density cross-linked polyolefin closed cell foam is an ideal material for use in these vehicle washing apparatuses since it does not absorb moisture, does not retain dirt, is lightweight, and is extremely gentle on the finish of the vehicles. Unfortunately, heretofore it has been extremely difficult to mount such material to a suitable drum because of the material not being able to suffer any substantial transverse sheer without tearing and fragmenting.

U.S. Pat. No. 4,377,878 to Pecora issued on Mar. 29, 1983, discloses a vehicle-finishing device which includes a plurality of elongated flexible elements that are wrapped around a rod and forced into receptor notches in the hub to be retained therein.

U.S. Pat. No. 4,567,619 to Clark; U.S. Pat. No. 4,653,135 to Clark; and U.S. Pat. No. 4,597,128 to Roncaglione each teach variations on insertion of brush material in a longitudinal groove or recess in a hub to retain the material thereafter.

None of the aforementioned mounting methods are satisfactory for mounting high density cross-linked polyolefin closed cell foam since cross sheer placed on the foam, when the drum rotates, causes it to tear and fall apart.

A different approach is taken in U.S. Pat. No. 4,670,929 to Hanna wherein the material is mounted to a drum by a plate and screws.

U.S. Pat. No. 3,594,842 to Clark teaches that clamping of brush material into groups and the mounting thereof in a drum like configuration.

U.S. Pat. No. 3,939,521 to Clark teaches the mounting of gathered bristles through openings disposed in a drum, the bristles being retained by wires or the like. Similarly U.S. Pat. No. 5,592,712 to Favagrossa teaches the gathering of bristles in assemblies and their mounting in discreet seats.

A different approach is taken in U.S. Pat. No. 5,077,895 to Ennis which disclosed the use of fur like material mounted to elastic cords around the circumference of a drum.

The gathering of bristles into groups and the clamping of fabric to a drum-like member is also disclosed in U.S. Pat. No. 4,815,158 to Crotts.

None of the aforenoted methods of affixment are suitable to secure high density cross-linked polyolefin closed cell foam to a rotatable drum.

The instant invention, therefore, has found a brush material far superior to anything used before in the car washing arts, but, prior to the present invention, no satisfactory means have been found for the attachment of high density cross-linked polyolefin closed cell foam material to a rotating hub for the cleaning of vehicles.

SUMMARY OF THE INVENTION

It is a primary object of the present invention to provide a vehicle washing apparatus that is gentle on vehicle finishes, yet effective in cleaning.

It is the further object of the present invention to provide a vehicle cleaning apparatus which employs high-density cross-linked polyolefin closed cell foam as a brush material.

It is still a further object of the present invention to provide a vehicle washing apparatus that has sufficient longevity for cost-effective commercial use.

It is still another object of the present invention to provide a vehicle washing apparatus wherein the brush material thereof can easily and readily be replaced.

It is still another further object of the present invention to provide a vehicle washing apparatus which is essentially modular and can be assembled in various configurations to be fitted to existing automated equipment.

It is another still further object of the present invention to provide a vehicle washing apparatus which is inexpensive to manufacture.

It is still another further object of the present invention to provide a vehicle washing apparatus that is effective and low in maintenance.

It is still an additional object of the present invention to provide a vehicle washing apparatus which is simple in design, rugged in construction, easy to use, and efficient in operation.

These objects, as well as further objects and advantages of the present invention will become readily apparent after reading the ensuing description of a non-limiting illustrative embodiment and reviewing the accompanying drawings.

A vehicle washing apparatus in accordance with the principles of the present invention includes a substantially cylindrical surface having an inner face and an outer face, a substantially cylindrical surface having a plurality of spaced apart slots disposed therethrough; and a plurality of flexible elongated pads, each of the pads for insertion through adjacent ones of the spaced apart slots and for radially extending on the outer face of the cylindrical surface, a portion of each of the pads being disposed adjacent to the inner face of the cylindrical surface. In the preferred embodiment the cylindrical surface is constructed of a plurality of modular interlocking arcuate plates each mounting high-density cross-linked polyolefin closed cell foam brushes.

BRIEF DESCRIPTION OF THE DRAWINGS

In order that present invention may be more fully understood, it will now be described, by way of example, with reference to the accompanying drawings in which:

FIG. 8 is a top plan view of the spoke member of the subject invention.

FIG. 9 is a side view of the spoke member of the subject invention taken substantially along the lines of 9—9 of FIG. 8.

DETAILED DESCRIPTION OF THE PREFERRED EMBODIMENT

Figure 1:
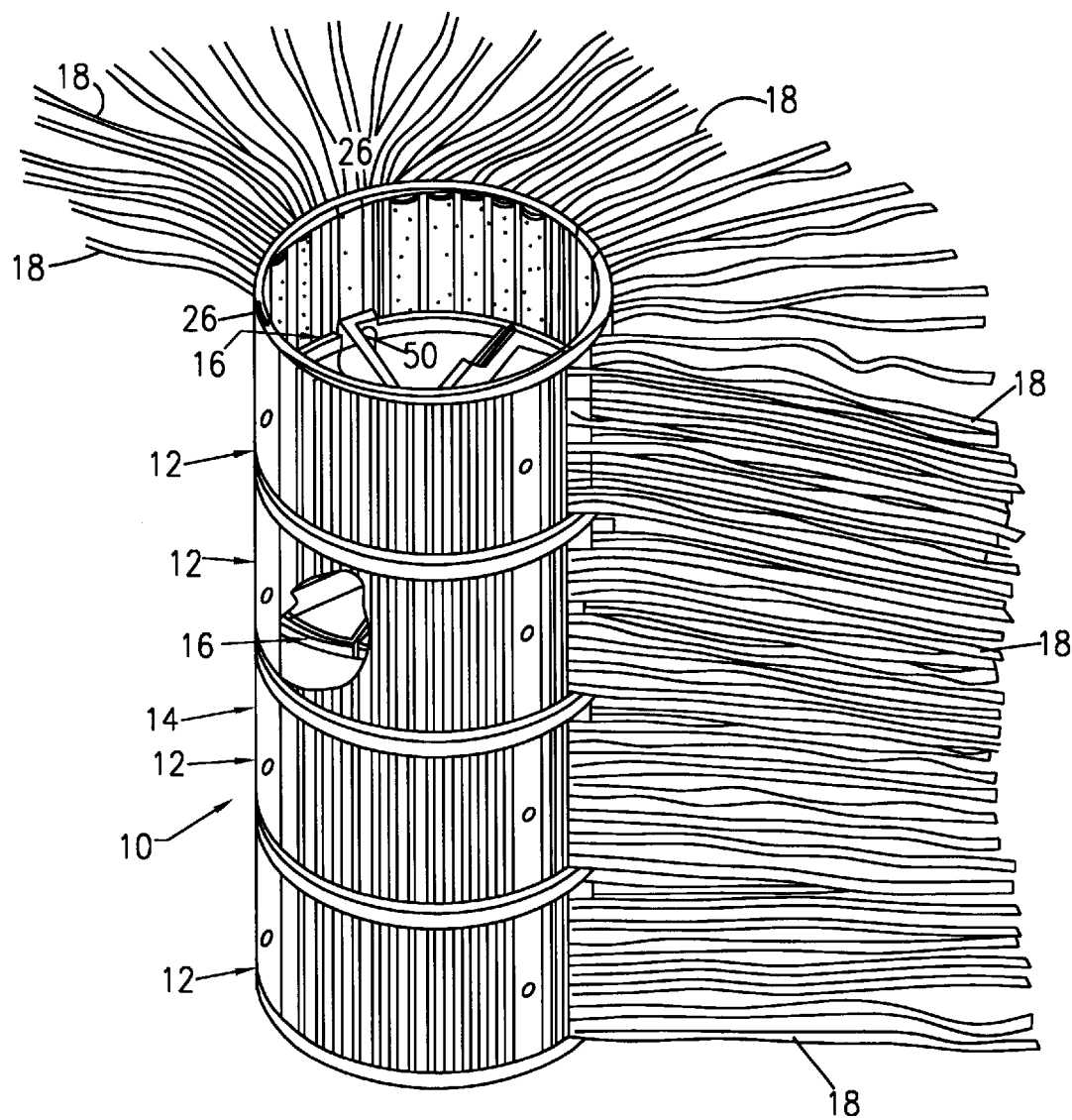
FIG. 1 is pictorial representation of the preferred embodiment of the present invention partially broken away to show the interior mounting thereof.

Referring now to the Figures, and more particularly to FIG. 1 thereof, there is illustrated therein a vehicle washing apparatus 10 which comprises a plurality of arcuate sections 12 that are assembled together in modular fashion to form a substantially cylindrical assembly 14. Although the preferred embodiment is modular, the cylindrical assembly could be unitary or constructed of non-modular sections within the spirit and scope of the invention. The substantially cylindrical assembly 14 is mounted by a plurality of spoke members 16, as further illustrated in FIGS. 5, 7, 8, and 9. Mounted through the substantially cylindrical assembly 14 are a plurality of elongated pads 18. The elongated pads 18 will be hereinafter described in conjunction with FIGS. 2 through 6. Although the elongated pads 18 are shown in FIG. 1 only affixed to part of the substantially cylindrical assembly 14 for purposes of illustration, the entire cylindrical assembly 14 would be populated with such elongated pads 18 when the device is put to use.

Rotating substantially cylindrical assemblies are well known in the car washing art and are mounted to rotating shafts. The subject invention is configured so that it can mount to a rotating shaft on conventional car washing apparatus presently known, as a substitution for currently employed devices.

The elongated pads 18 are formed of a high-density cross-linked polyolefin closed cell foam or similar material having the same or similar characteristics. High-density cross-linked polyolefin closed cell foam is particularly desirable because it does not absorb moisture, does not retain dirt, is lightweight, and has proven to be extremely gentle on the finish of vehicles.

Figure 5:
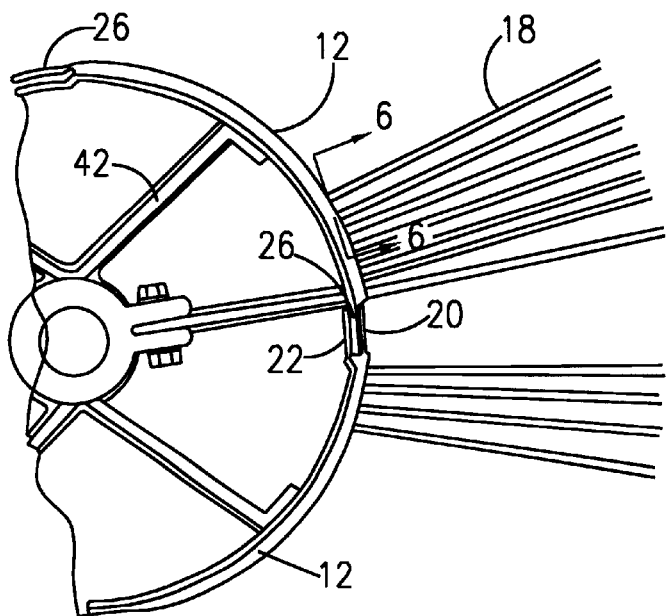
FIG. 5 is a fragmentary top view of the preferred embodiment of the present invention.
Figure 6:
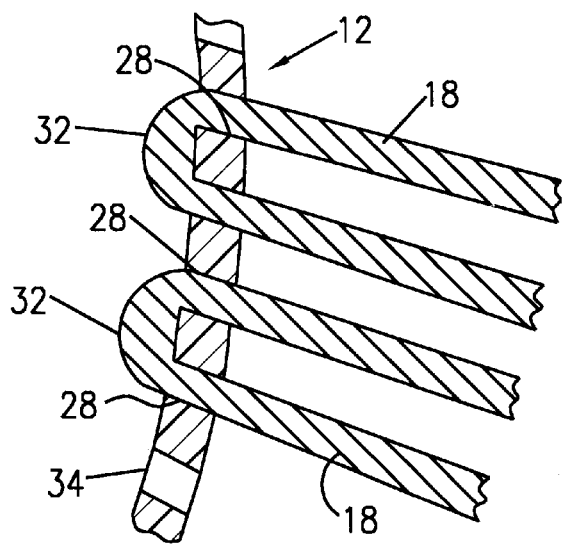
FIG. 6 is a fragmentary cross-section of FIG. 5 taken substantially along the lines 6—6 of FIG. 5.
Figure 7:
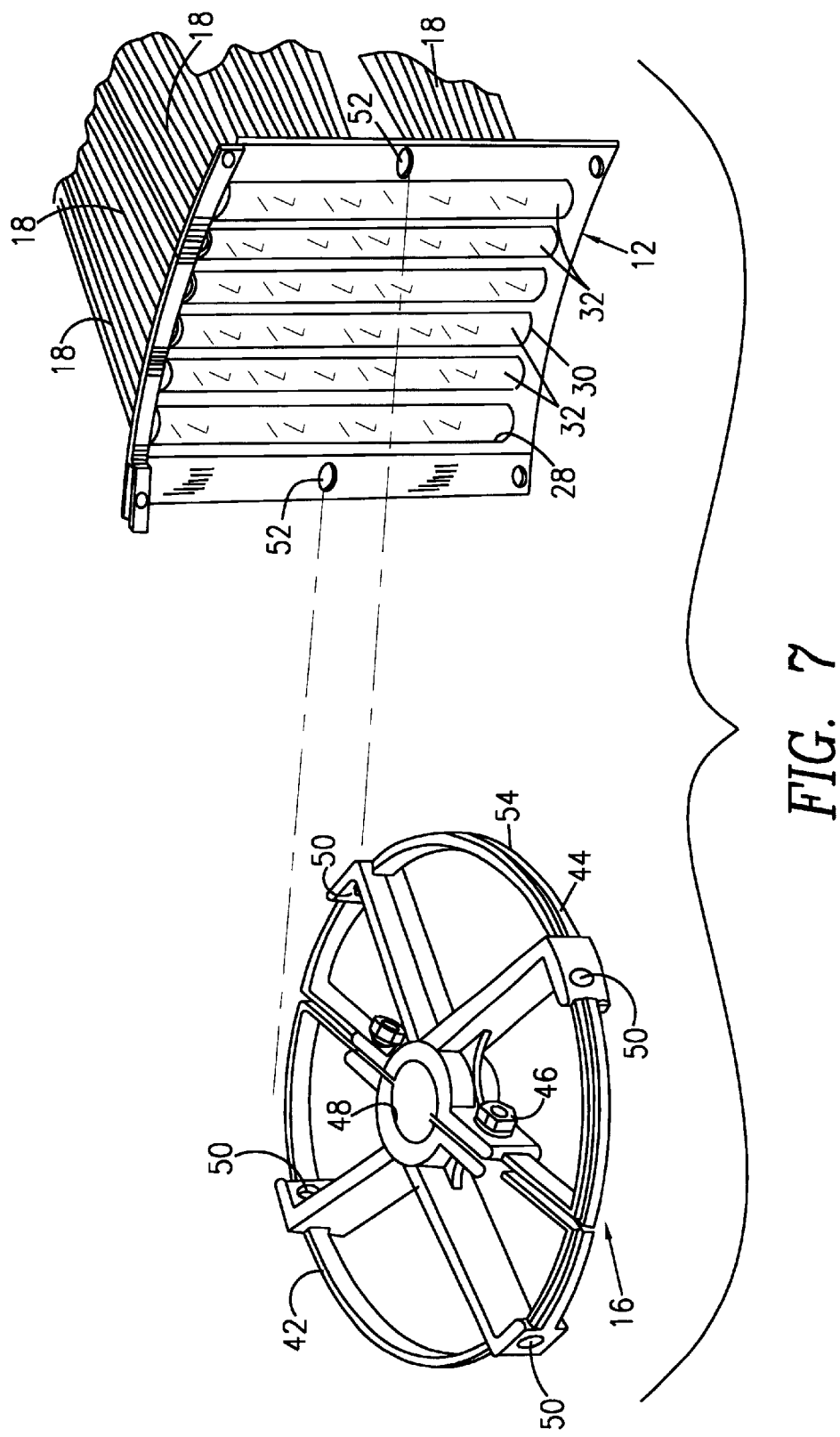
FIG. 7 is an enlarged exploded pictorial representation of a modular arcuate segment of the subject invention and the manner in which it mounts to a spoke member thereof.

The arcuate sections 12 are each substantially the same and have formed therein a lip 20 and a flange 22. The lip 20 and flange 22 are mating such that when they are placed adjacent to each other as shown in FIG. 5 and bolts are inserted through apertures 24, the bolts not being shown, adjacent arcuate sections can be assembled into the substantially cylindrical assembly 14 as shown in FIG. 1. The arcuate sections 12 are preferably joined with zinc plated bolts or the like although other methods of fixation may be used within the spirit and scope of the invention. The arcuate sections 12 themselves are preferably formed from plastic or other suitable fluid resistant material.

The arcuate sections 12, as shown in the Figures include a clamp 26 which serves to help register adjacent arcuate sections 12 next to each other when assembled into the substantially cylindrical assembly 14. Instead of using clamp 26 and the zinc plated bolts, not illustrated, other assembly means that are well-known in the joining art, such as, but not limited to: brackets, ultrasonic welding, adhesives, snaps, etc. could be employed in assembling the arcuate sections 12 into the substantially cylindrical assembly 14 within the spirit and scope of the invention.

Referring now specifically to FIGS. 2 through 6, the arcuate sections 12 can be seen to include a plurality of slots 28. The slots 28 are preferably substantially parallel and when the arcuate sections 12 are assembled into the substantially cylindrical assembly 14, the slots 28 are substantially parallel to the longitudinal axis of the substantially cylindrical assembly 14. The elongated pads 18 each include a pair of arcuate notches 30 substantially at their mid-section such that the dimension from the belly of one notch 30 in pad 18 to the belly of the other notch 30 in pad 18 is substantially equal to the length of the slots 28. The provision of notches 30 in the elongated pads 18 acts as a method of locking the pads in position relative to arcuate sections 12 and ultimately substantially cylindrical assembly 14 when placed in position relative thereto.

Figure 2:
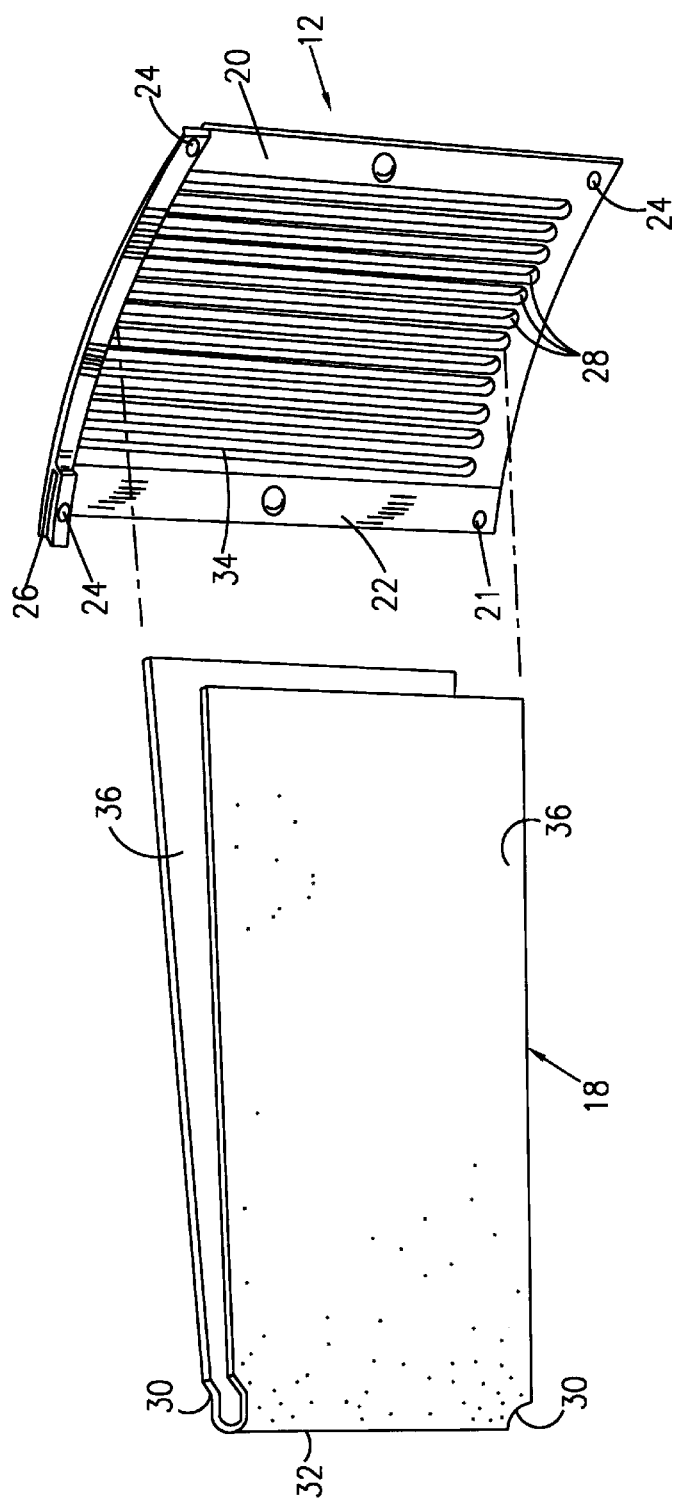
FIG. 2 is a pictorial representation of an modular arcuate section of the subject invention prior to insertion therein of the elongated pads which forms the brush thereof.
Figure 3:
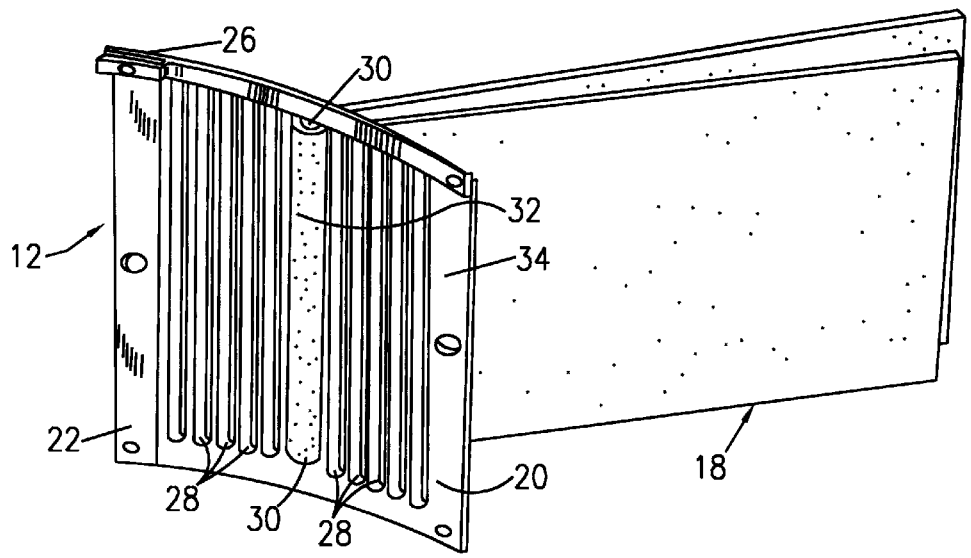
FIG. 3 is a pictorial representation of the modular arcuate segment after insertion of the pad therethrough.
Figure 4:
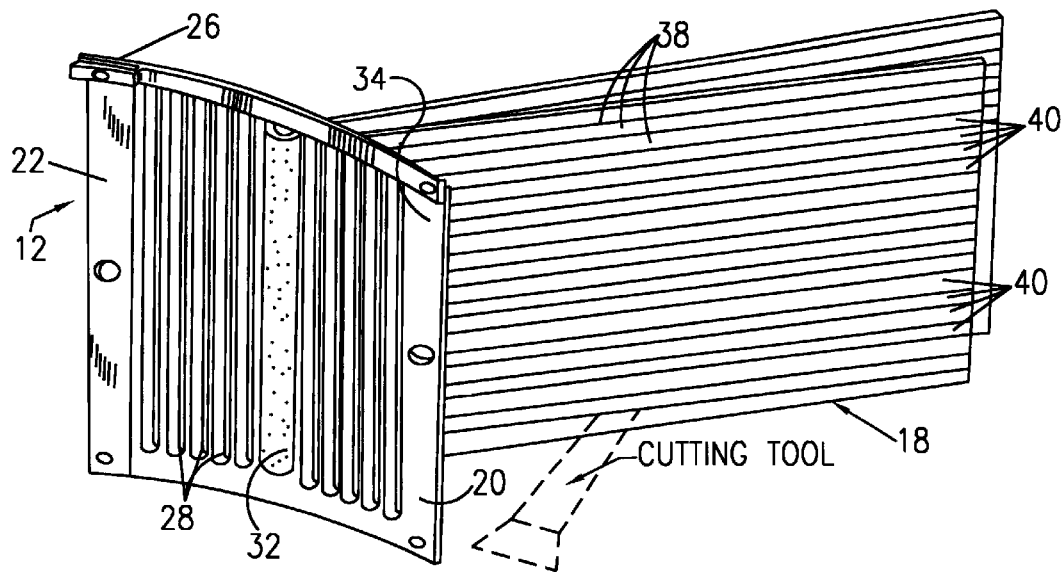
FIG. 4 is a pictorial representation of a modular arcuate segment after cutting of the pad into a brush.

Referring specifically to FIG. 2 there is illustrated therein a pad 18, bearing notches 30, prior to insertion through slots 28 in arcuate section 12. Referring to FIG. 4, the pad 18 has been inserted through an adjacent pair of slots 28 such that the notches 30 thereof fall in position substantially locking the pads 18 in the slots 28 of the arcuate sections 12 as a result of the relative dimensioning of these components. Therefore, portion 32 of the elongated pads 18 which resides adjacent to the interior face 34 of the arcuate sections 12 is fixed in position relative thereto maintaining the dimensional equality of the legs 36 of the elongated pads 18.

After insertion through the slots 28, the substantially elongated pads 18 are then preferably cut by a cutting tool or other methods known in the art, by virtue of a plurality of slits 38, to form a plurality of co-joined segments 40 each free to move independently upon rotation of the vehicle washing apparatus 10 as simulated in FIG. 1.

By passing the elongated pads 18 through their respective slots 28 in the arcuate sections 12 in this manner, forces evident upon rotation of the substantially cylindrical assembly 14, acting on the pads 18, are transferred to the portions 32 thereof, such forces bearing against the inner face 34 of the arcuate sections 12 and minimizing stresses which would tend to cause the segments 40 of the elongated pads 18 to tear therefrom. Further, the stresses, including transverseshear, placed upon the pads 18 as a result of rotation of the substantially cylindrical assembly 14 on a rotating shaft is borne by portion 32 and, in practice, does not affect the integrity of the pads 18.

This method of affixment has proved satisfactory in serviceability and longevity where the mere clamping or the like of an elongated pad to a cylindrical assembly has proven to cause the segments of a suchly configured elongated pad to tear.

Further, as elongated pads 18 wear they can be individually replaced as necessary since each elongated pad 18 is independent from all the other elongated pads 18. Further, arcuate sections 12 can be replaced in the modular matrix that forms the substantially cylindrical assembly 14, as necessary, without requiring replacement of the entire assembly therefore providing truly modular construction.

Referring now specifically to FIGS. 1, 5, 7, 8 and 9 there is illustrated therein spoke members 16 each comprising halves 42 and 44 that are bolted together by a plurality of zinc plated bolts 46 having mating nuts or the like.

The halves 42 and 44 of the spoke members 16 are substantially identical and when bolted together with the bolts 46 create an opening 48 dimensioned to clamp therein a rotating shaft of a conventional car washing apparatus. The spoke members 16 serves to mount the substantially cylindrical assembly 14 and are bolted thereto by a plurality of bolts, not illustrated, to apertures 50 disposed in the halves 42 and 44 that mate with corresponding apertures 52 disposed in the arcuate sections 12.

Although this particular manner of affixation or joining with bolts is illustrated, it is to be understood that alternate means could be used within the spirit and scope of the invention. Each of the halves 42 and 44 have disposed about the outer radius thereof, respectively, annular surfaces 54 and 56 dimensioned such that when the spoke members 16 are affixed in position relative to the arcuate sections 14 the annular surfaces 54 and 56 bear again the inner portions 32 of the elongated pads 18 and further lock them in position. The annular surfaces 54 and 56 can take other forms and shapes within the spirit and scope of the invention, the essential feature being contact with the inner portions 32 and pressing of the same against the inner face 12 of the arcuate sections 12.

It is to be understood that the number of arcuate sections 12 used to form a substantially cylindrical assembly 14 and the number of spoke member 16 used to mount the substantially cylindrical assembly 14 can be varied within the spirit and scope of the invention along with the design of the individual components in accordance with the skill of one of ordinary skill in the art within the spirit and scope of the invention.

It will be further understood that various changes in the details, materials, arrangements of parts and operations which have been herein described and illustrated in order to explain the nature of the invention may be made by those skilled in the art within the principles and scope of the invention.

Having thus set forth the nature of the invention, what is claimed is:

1. A vehicle washing apparatus for mounting on a rotatable shaft comprising:
    a substantially cylindrical surface having an inner face, and an outer face, said substantially cylindrical surface having a plurality of spaced apart slots disposed therethrough; and
    a plurality of flexible elongated pads, each of said pads for insertion through adjacent said spaced apart slots and for radially extending from the outer face of said substantially cylindrical surface, a contiguous portion of each of said pads passing from said outer face to said inner face and from said inner face to said outer face with the section therebetween being disposed adjacent to said inner face of said substantially cylindrical surface.

2. A vehicle washing apparatus as claimed in claim 1, wherein each of said flexible elongated pads comprises positive locking means for retention by said substantially cylindrical surface.

3. A vehicle washing apparatus as claimed in claim 2, wherein said pads each have a width and each of said slots have a length, said positive locking means comprising said pads being dimensioned to have said width thereof a dimension greater than said length of a corresponding said slot, each of said pads being notched where said pads pass through said slots, said notches reducing said width of said pads adjacent to said slots to substantially the same dimensions as the length of a corresponding said slot.

4. A vehicle washing apparatus as claimed in claim 2, wherein each of said pads comprised a high-density cross-linked polyolefin closed cell foam.

5. A vehicle washing apparatus as claimed in claim 4, wherein at least some portion of said pads radially extending from said substantially cylindrical surface is cut into a plurality of cojoined segments.

6. A vehicle washing apparatus as claimed in claim 1, wherein each of said pads comprise a high-density cross-linked polyolefin closed cell foam.

7. A vehicle washing apparatus as claimed in claim 6, wherein at least some portion of said pad radially extending from said substantially cylindrical surface is cut into a plurality of cojoined segments.

8. A vehicle washing apparatus as claimed in claim 1, further comprising at least one spoke member, said at least one spoke member for mounting said substantially cylindrical surface on the rotatable shaft.

9. A vehicle washing apparatus as claimed in claim 8, wherein said at least one spoke member comprises two halves forming an outer radius, said two halves adapted to clamp therebetween the rotatable shaft, said two halves for mounting on said outer radius thereof said substantially cylindrical surface.

10. A vehicle washing apparatus as claimed in claim 1, wherein said substantially cylindrical surface comprises a tubular hub.

11. A vehicle washing apparatus as claimed in claim 10, wherein said tubular hub comprises a plurality of interlocking modular arcuate plates.

12. A vehicle washing apparatus as claimed in claim 1, further comprising at least one spoke member, said substantially cylindrical surface comprising a tubular hub, said at lease one spoke member for mounting said tubular hub on the rotatable shaft.

13. A vehicle washing apparatus as claimed in claim 12, wherein said at least one spoke member comprises two halves forming an outer radius, said two halves adapted to clamp therebetween the rotatable shaft, said two halves for mounting on said outer radius thereof of said tubular hub.

14. A vehicle washing apparatus as claimed in claim 13, wherein said tubular hub comprises a plurality of interlocking modular arcuate plates.

15. A vehicle washing apparatus as claimed in claim 1, further comprising locking means for retaining said flexible elongated pads in position relative to said substantially cylindrical surface.

16. A vehicle washing apparatus as claimed in claim 15, further comprising at least one spoke member, said at least one spoke member for mounting said substantial cylindrical surface on the rotatable shaft, said at least one spoke member forming an outer radial surface, said at least one spoke member for mounting on the rotatable shaft, said at least one spoke member for mounting on said outer radius thereof said substantially cylindrical surface, said locking means comprising an annular portion disposed on said spoke member on said outer radial surface thereof pressing adjacent said flexible elongated pads against said inner face of said substantially cylindrical surface.

17. A vehicle washing apparatus as claimed in claim 16, wherein at least one said spoke member comprises two halves adapted to clamp therebetween the rotatable shaft.

18. A vehicle washing apparatus as claimed in claim 15, wherein said substantially cylindrical surface comprises a tubular hub.

19. A vehicle washing apparatus as claimed in claim 18, wherein said tubular hub comprises a plurality of interlocking modular arcuate plates.

20. A vehicle washing apparatus for mounting on a rotatable shaft comprising:

a substantially cylindrical surface having an inner face and an outer face, said substantially cylindrical surface having a plurality of spaced apart slots, said substantially cylindrical surface being a tubular hub, said tubular hub including a plurality of interlocking modular arcuate plates;

a plurality of flexible elongated pads, each of said pads for insertion through adjacent said spaced apart slots and for radially extending from the outer face of said substantially cylindrical surface, a portion of each of said pads being disposed adjacent to said inner face of said substantially cylindrical surface, each of said flexible elongated pads comprising positive locking means for retention by said substantially cylindrical surface, each of said pads having a width, each of said slots having a length, said positive locking means comprising said pads being dimensioned to have said width thereof a dimension greater than said length of a corresponding said slot, each of said pads being notched where said pads pass through said slots, said notches reducing said width of said pads adjacent to said slots to substantially the same dimensions as the length of a corresponding said slot, each of said pads being formed of a high density cross-linked polyolefin closed cell foam, at least some portion of said pads radially extending from said substantially cylindrical surface being cut into a plurality of cojoined segments, said at least one spoke member for mounting said tubular hub on the rotatable shaft, said at least one spoke member including two halves forming an outer radial surface, said two halves adapted to clasp therebetween the rotatable shaft, said two halves for mounting on said outer radial surface thereof said tubular hub; and secondary locking means for retaining said flexible elongated pads in position relative to said substantially cylindrical surface, said secondary locking means including an annular portion disposed on said spoke member on said outer radial surface thereof pressing adjacent said flexible elongated pads against said inner face of said substantially cylindrical surface.

21. A vehicle washing apparatus for mounting on a rotatable shaft comprising:

a substantially cylindrical surface having an inner face and an outer face, said substantially cylindrical surface having a plurality of spaced apart slots disposed therethrough; and a plurality of flexible elongated pads, each of said pads for insertion through adjacent said spaced apart slots and for radially extending from the outer face of said substantially cylindrical surface, a portion of each of said pads being disposed adjacent to said inner face of said substantially cylindrical surface, each of said flexible elongated pads including positive locking means for retention by said substantially cylindrical surface, said pads each have a width and each of said slots have a length, said positive locking means comprising said pads being dimensioned to have said width thereof a dimension greater than said length of a corresponding said slot, each of said pads being notched where said pads pass through said slots, said notches reducing said width of said pads adjacent to said slots to substantially the same dimensions as the length of a corresponding said slot.

22. A vehicle washing apparatus for mounting on a rotatable shaft comprising:

a substantially cylindrical surface having an inner face and an outer face, said substantially cylindrical surface having a plurality of spaced apart slots disposed therethrough;

a plurality of flexible elongated pads, each of said pads for insertion through adjacent said spaced apart slots and for radially extending from the outer face of said substantially cylindrical surface, a portion of each of said pads being disposed adjacent to said inner face of said substantially cylindrical surface; and locking means for retaining said flexible elongated pads in position relative to said substantially cylindrical surface.

23. A vehicle washing apparatus as claimed in claim 22, further comprising at least one spoke member, said at least one spoke member for mounting said substantially cylindrical surface on the rotatable shaft, said at least one spoke member forming an outer radial surface, said at least one spoke member for mounting on the rotatable shaft, said at least one spoke member for mounting on said outer radius thereof said substantially cylindrical surface, said locking means comprising an annular portion disposed on said spoke member on said outer radial surface thereof pressing adjacent said flexible elongated pads against said inner face of said substantially cylindrical surface.

24. A vehicle washing apparatus as claimed in claim 23, wherein at least one spoke member comprises two halves adapted to clamp therebetween the rotatable shaft.

25. A vehicle washing apparatus as claimed in claim 22, wherein said substantially cylindrical surface comprises a tubular hub.

26. A vehicle washing apparatus as claimed in claim 25, wherein said tubular hub comprises a plurality of interlocking modular arcuate plates.

* * * * *